United States Patent Office 3,584,341
Patented June 15, 1971

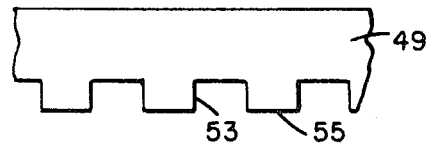
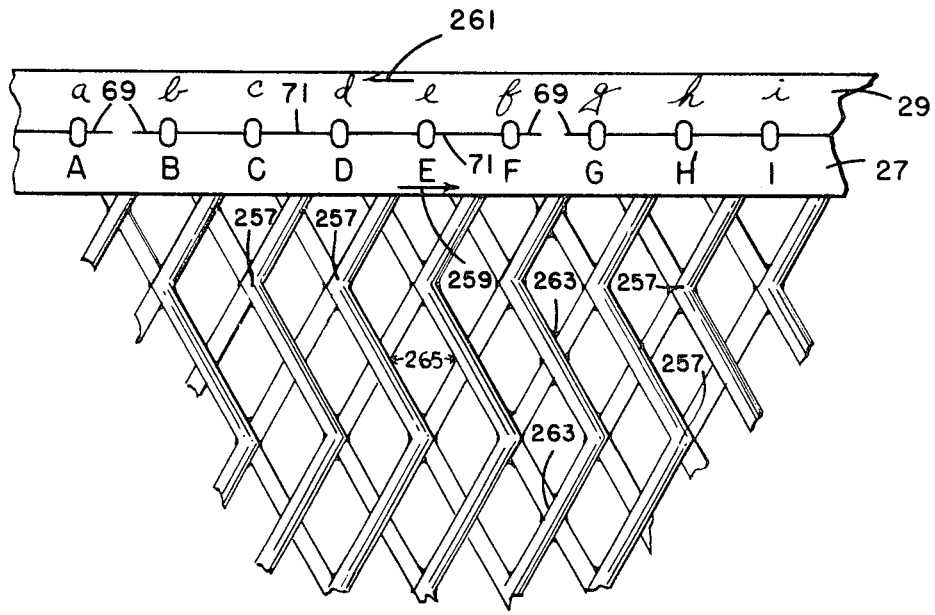
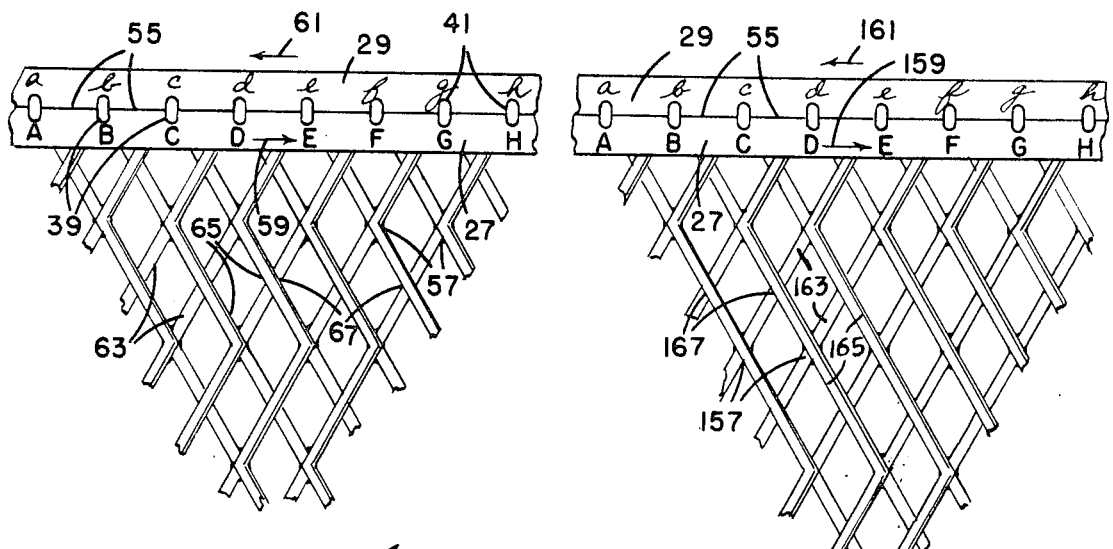

3,584,341
APPARATUS FOR MAKING NETLIKE
STRUCTURES
Theodore H. Fairbanks, Liverpool, Pa., assignor to
FMC Corporation, Philadelphia, Pa.
Original application July 27, 1967, Ser. No. 656,501.
Divided and this application Sept. 22, 1969, Ser. No.
859,941
Int. Cl. B29f 3/00
U.S. Cl. 18—12                              7 Claims

ABSTRACT OF THE DISCLOSURE

Apparatus for making extruded netlike structures which includes a pair of opposing die-carrying members having sets of cooperating, complementary die-forming orifices through which plastic material is extruded, and a separator plate disposed between such members and having slots spaced at intervals thereof which provide for communication between orifices in the opposed members at only certain of their aligned positions.

---

This is a division of application Ser. No. 656,501, filed July 27, 1967.

The present invention relates to an improved apparatus for making netlike structures by extrusion.

U.S. Pat. No. 2,919,467 is directed to the manufacture of netlike structures in which the mesh intersection-forming portions are each composed of an integrally extruded plastic mass and the mesh strand-forming portions are divisions of such intersection-forming portions, with the whole fabric or structure being an integrally extruded entity. Various modifications of equipment and operation are described in this prior patent but, in general, the structures which result are all essentially of two-dimensional character wherein an integral junction is formed at every intersection of mesh strands. Such known netlike structures have found little use in applications where fabrics are conventionally employed, often lack the necessary strength for their proposed or intended uses, and have only limited tear-propagation resistance. Accordingly, a primary object of this invention is to provide a generally new or improved and more satisfactory apparatus for making a netlike structure or fabric by extrusion.

Another object of this invention is the provision of an apparatus for making netlike structures which are three-dimensional in character and more closely approach a woven fabric in appearance.

Still another object is the provision of an apparatus for producing netlike structures in a variety of designs.

A still further object is the provision of an improved apparatus in which a variety of plastic materials are simultaneously extruded to provide netlike structures having different characteristics along selected portions thereof.

These and other objects are accomplished in accordance with the present invention by an apparatus for carrying out a method in which each strand junction of a plastic netlike structure is extended through cooperating extrusion orifices as an integral, unitary junction-forming stream. With the continued extrusion, each junction-forming stream is divided about a surface of separation, which is parallel to the opposite faces of the netlike structure when laid flat, to form separate mesh strand-forming streams. The mesh strand-forming streams which extend from the individual junctions are caused to intersect with mesh strand-forming streams extending from other of such junctions. The individual mesh strand-forming streams extending from at least some of such junctions are maintained separated from intersecting mesh strand-forming streams, which are directly adjacent thereto, at certain of their points of crossing. Subsequently, the mesh strand-forming streams are united into further unitary junction-forming streams.

The division of the junction-forming streams and the separation into the strand-forming streams and the uniting into the further junction-forming streams is effected by relatively displacing such streams transversely to the direction of extrusion. By continuously repeating the above sequence of forming, intersecting and uniting of mesh strand-forming streams, followed by setting of the same, an improved integral netlike structure or fabric is provided.

More specifically, the apparatus of the present invention includes a pair of opposing displaceable die-carrying members having sets of cooperating, complementary die-forming orifices to which flowable, plastic material is delivered. A separator plate is positioned between and in sliding contact with the opposing surfaces of the die-carrying members. The separator confines extrusion of the flowable plastic material to the orifices and has a series of spaced partitions. Means are provided for relatively displacing the die-carrying members, such as by oscillating or reciprocating the same in opposite directions. The separator plate may remain stationary or may also be moved, as with a reciprocating or oscillating motion. The motion imparted to the separator plate may be continuous or intermittent and its rate as well as its stroke of movement may be the same as or differ from that of the die-carrying members.

During the operation of the described apparatus, the relative displacement of the die-carrying members causes the orifices of the respective sets to be moved into and out of registration or alignment with one another. The separator plate partitions serve to prevent communication between at least some of the orifices of the respective sets of orifices in certain of their positions of registration, as determined by the spacing and/or rate, degree and stroke of separator plate movement.

When orifices of the respective sets are in communicating relationship, the plastic material which is delivered thereto is extruded through the aligned orifices as integral, unitary junction-forming streams. As such orifices are urged out of alignment by the relative displacement of die-carrying members, the junction-forming streams are each divided into separate strand-forming streams. With movement of the orifices of the respective sets into aligned but non-communicating relationship, as a result of an interposed separator plate partition, the strand-forming streams intersect but do not contact at their point of crossing and thus remain separate from each other in the finished netlike structure.

The orifices of the sets of orifices may be of any desired cross-section and may vary to some degree in spacing and/or number, as more fully described hereafter.

The partitions of the separator plate are only of such thickness as is required to satisfy strength requirements, so as to minimize any tendency for plastic material to flash into the mesh openings of the netlike structure and may differ in width. Of particular importance, is that the space between the die-carrying members, which is occupied by the spaced partitions, be at all times closed by the separator plate at its end adjacent to the entrance ends of extrusion orifices. In other words, all of the plastic material which is to be extruded must flow through the entrance ends of the orifices of the die-carrying members. Thus, while the free ends of the partitions may terminate in advance of or beyond the exit ends of the extrusion orifices in the die-carrying members, it is essential that the spaces between such partitions do not extend beyond the entrance ends of such orifices.

In the apparatus of the present invention, a separator plate having partitions of like width and which remains fixed or is continuously moved at a constant rate will provide a netlike structure in which intersecting strands are unconnected at least at crossing points which alternate with strand junctions. On the other hand, such fixed or movable separator plate having partitions which are of different widths will provide a netlike structure which appears to have a random arrangement of strand junctions. Variation in what appears as the weave of the netlike structure can be achieved by changing the stroke of the relatively displaceable die-carrying members.

Further variation in the arrangement or pattern of strand junctions of the netlike structure can be achieved by moving the separator plate at a varying and/or intermittent rate of speed or a speed which differs from that of the relatively displaceable members or by periodically changing the motion of such plate, say from reciprocating or oscillating and/or by moving the separator plate at an angle to the direction of extrusion. Regardless of what particular conditions are employed, with die-carrying members which are moved relative to each other with a reciprocating or oscillating motion, for example, it is preferred that the orifices of such members be in communicating relationship at the end of each stroke thereof.

As in the manufacture of conventional netlike structures, the size and shape of the mesh openings of the structure formed by the apparatus of the present invention can be altered by varying the rate of extrusion and/or the speed of relative displacement of the die-carrying members.

The plastic materials delivered to the separate sets of orifices may differ in composition and/or color so that the intersecting mesh strands of the resulting netlike structure exhibit different properties, as for example color or texture.

The resulting netlike structure has intersecting mesh strands, which give the appearance of a woven fabric, in which at least some of the individual mesh strands are bonded to certain of the intersecting strands which are directly adjacent thereto at their points of crossing to form integral, unitary strand junctions and are unconnected to other of such directly adjacent intersecting strands at their points of crossing.

During the formation of a netlike structure by relative movement of the die-carrying members, the individual strand-forming stream extruded through each of the orifices of the sets of orifices actually moves along a zig-zag or sinuous path, changing its direction at certain of the junctions and at all times remaining either over or under strands with which it intersects. However, in the finished netlike structure, it appears as though the individual strands alternately cross over and under intersecting strands at certain of their junctions so that the structure itself gives the appearance of having a woven pattern.

Throughout the disclosure, the terms "registration," "register" and "alignment" mean the juxtaposition of die orifices of the respective sets in their displacement so as to coincide or come exactly opposite to one another or into partially overlapping positions. The term "communication," also as employed with the sets of die orifices, means that alignment orifices are open to each other so that they together form a single composite orifice through which each integral intersection is extruded.

While the following detailed description makes reference to elongated or flat die-carrying members, the teachings of this invention are equally applicable to annular die-carrying members which can be relatively displaced with a rotary or oscillating movement. Included within the scope of the present invention is apparatus which includes more than two die-carrying members, with a partitioned separator plate positioned between adjacent of such members.

The teachings of the present invention are applicable for use with a variety of strand forming materials, which are referred to by the terms "plastic" and "flowable strand-forming materials," including materials which are thermoplastic, such as polyamides or superpolyamides, polyesters, polyvinyl chloride, copolymers thereof, polyolefins, cellulose acetate, etc., natural or synthetic rubbers, thermosetting materials or wet-spinnable materials, such as viscose, cupro-ammominum cellulose, or carboxymethyl cellulose. Such materials may include various additives such as stabilizers, dyes, foaming agents, etc., if so desired. It will be apparent that the manner by which the extruded junction and mesh-strand forming streams are set will depend upon the particular material which is being employed.

For a greater understanding of this invention, reference is made to the following detailed description and drawing in which FIG. 1 is a vertical section taken transversely of the apparatus of the present invention;

FIG. 3 is a side view of an element of the apparatus shown in FIG. 1, with portions thereof being broken away;

FIG. 4 is a diagrammatic view illustrating the simulated woven pattern of the netlike structure which is produced under one mode of the operation of the apparatus shown in FIG. 1;

FIG. 5 is a view similar to FIG. 4 illustrating the simulated woven pattern of a netlike structure produced under another mode of operation of the apparatus shown in FIG. 1;

FIG. 6 is a view similar to FIG. 4 illustrating the operation of a modified form of apparatus.

Figure 1:
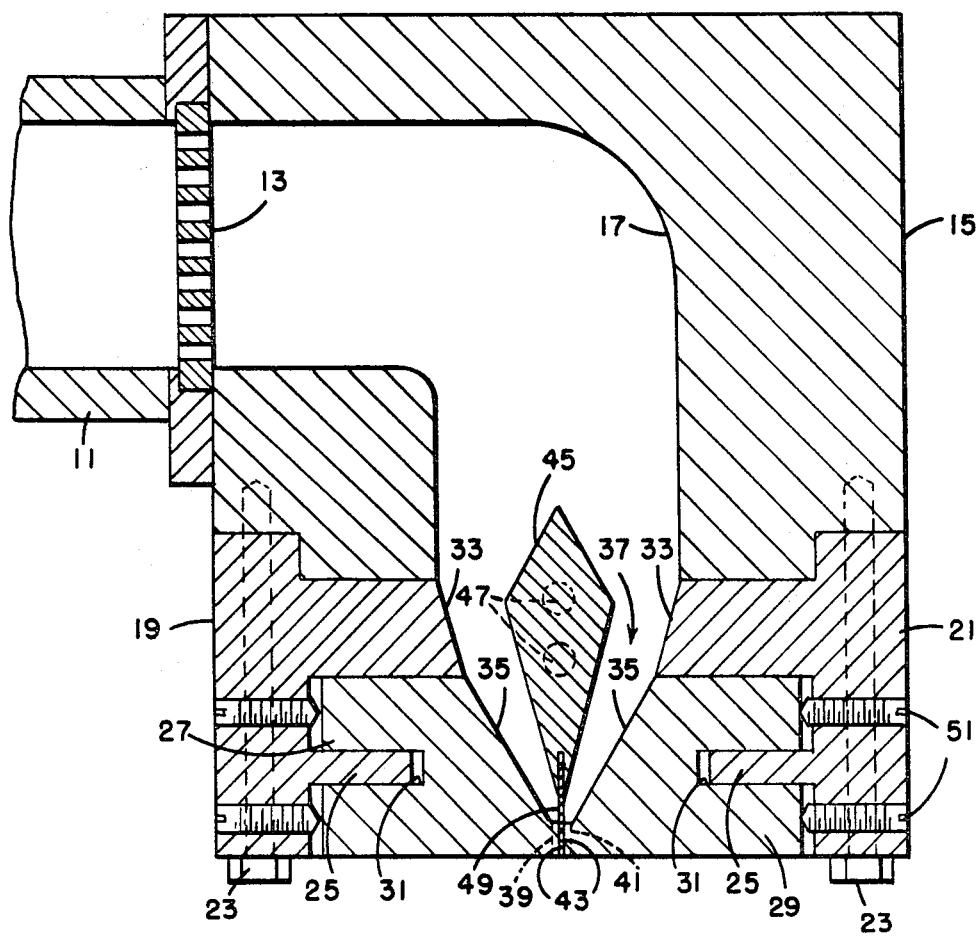

With reference to the drawing, the apparatus shown in FIG. 1 is designed for making a net-like structure or fabric from thermoplastic material and includes an extruder barrel 11 through which a molten theromplastic material is advanced by a feed screw, not shown, a screen or breaker plate 13, and an extrusion block 15 having a flow channel 17, A pair of guides 19 and 21 are fixed by bolts 23 to the extrusion block 15 and are each formed with a rib or rail 25 which together support flat die-carrying members 27 and 29 for sliding movement. More particularly, the ribs or rails 25 of the guides 19 and 21 are received within grooves 31 formed in the die-carrying members 27 and 29 so that the latter are adapted to be moved transversely of the direction of extrusion as well as in directions toward and away from each other.

As in conventional extrusion apparatus, electrical heaters and suitable insulation, not shown, may be provided about the extrusion barrel 11, block 15, and guides 19 and 21 to insure proper temperature control of the thermoplastic material during the extrusion operation.

Both the pair of guides 19 and 21 and the die-carrying members 27 and 29 are formed with opposing converging surfaces, as indicated at 33 and 35, which extend the length thereof and altogether provide a cavity 37 which receives the molten thermoplastic material from the flow channel 17. A set of spaced slots or grooves 39 and 41 is formed in each of the opposing surfaces 43 of the die-carrying members and terminate, at the outermost sides of such members in extrusion or die orifices. As best shown in FIGS. 4 and 5, the extrusion orifices of the respective die-carrying members 27 and 29 have been designated by capitol and lower case letters for the sake of simplicity and ease of description. Means, not shown, are provided for relatively displacing or reciprocating the die-carrying members 27 and 29 so that the sets of spaced slots 39 and 41, and the orifices defined by such slots are periodically registered or aligned with each other.

Positioned within and extending the length of the cavity 37 is a rigid bar 45 which is fixed by pins 47. A separator plate 49 is supported by and extends from the bar 45 and projects inbetween the die-carrying members 27 and 29. The opposing surfaces 43 of the die-carrying members are maintained in snug but slidable contact with the sides of the plate 49, as by adjusting screws 51 which extend through the guides 19 and 21 and abut against the die-carrying members. Means, not shown, may be provided for moving the separator plate relative to the supporting bar 45.

As best shown in FIG. 3, the free edge of the plate 49 is slotted at 53 to provide partitions 55. As heretofore mentioned, while the free ends of the partitions may terminate before, at or beyond the outermost surfaces of the die-carrying members 27 and 29, the slots 53 between such partitions must not open in the cavity 37. The partitions 55 serve to prevent the orifices in the die-carrying members 27 and 29 from communicating with each other in certain of their registered or aligned positions. For reasons as heretofore mentioned, the plate 49 is preferably made as thin as is permitted by its strength requirements.

In the operation of the apparatus described, molten thermoplastic material is advanced through the extruder barrel 11 and block flow channel 17 into the cavity 37. Relative movement is imparted to the die-carrying members 27 and 29, as by reciprocating the same in opposite directions, preferably at the same rate of speed. Concomitantly, with such relative displacement of the die-carrying members 27 and 29, the molten theromplastic material is extruded through the respective sets of orifices.

For a better understanding of the operation of the described apparatus, reference is made to FIG. 4 of the drawing, which illustrates the die-carrying members 27 and 29 and the free ends of the partitions 55 of the separator plate 49, which in this instance, is held stationary. In the illustrated position of the die-carrying members 27 and 29, the sets of orifices are in aligned or registered relationship and in communication with each other. Molten theromplastic material thus issues through each pair of such aligned and communicating orifices, such as A–a, B–b, C–c, etc., as a single stream to form integral, unitary junctions as indicated at 57. As the members 27 and 29 are moved in opposite directions, as shown by arrows 59 and 61, respectively, the sets of orifices are urged out of alignment so that the junction-forming streams are each divided to form mesh strand-forming streams as shown at 63 and 65.

With the continued movement of the members 27 and 29, the orifices A–b, B–c, C–d, etc. of the respective sets come into alignment but do not communicate with each other as a result of the interposed partitions 55. The molten thermoplastic material thus continues to issue from such orifices as separate streams which intersect, as shown at 67, but do not contact with each other at their points of crossing.

Further movement of the die-carrying members 27 and 29 in the directions of arrows 59 and 61 places the orifices A–c, B–d, C–e, etc. in aligned and communicating positions so that a single stream of molten thermoplastic material is extruded through each of such aligned orifices to again form the integral, unitary junctions 57. Upon reversing the direction of movement of the die-carrying members, the above-described sequence of forming, intersecting and uniting of mesh strand-forming streams is repeated. The extruded streams are then set, as by cooling to provide the integral net-like structure. Such net-like structure may be then oriented uniaxially or biaxially, if so desired.

It will be noted that the individual strand-forming stream extruded through each of the orifices of the sets of orifices actually moves along a zig-zag or sinuous path, changing its direction at junctions 57 and at all times remains either over or under strands with which it intersects. However, in the fiinished net-like structure, it appears as though the individual strands alternatively cross over and under intersecting strands at their junctions so that the structure itself exhibits a simulated woven pattern.

The appearance of the woven pattern of the net-like structure can be caried, as for example as shown in FIG. 5, by changing the stroke of the die-carrying members 27 and 29. In this net-like structure, it appears as though parallel mesh strands cross over or under intersecting mesh strands at alternate junctions 157, rather than at each junction as in the structure shown in FIG. 4.

With the exception of a longer stroke of the die-carrying members 27 and 29, the method employed in making the structure shown in FIG. 5 is the same as described above for making the structure of FIG. 4. More specifically, in the illustrated positions of the die-carrying members 27 and 29, and with the partitions 55 being fixed, molten thermoplastic material issues from the aligned and communicating orifices. A–a, B–b, C–c etc. as a single stream to form integral, unitary junctions as shown at 157. As the die-carrying members 27 and 29 are moved in the direction of arrows 159 and 161, the junction-forming streams are each divided into strand-forming streams 163 and 165 which will intersect with each other at 167 as the orifices A–b, B–c, C–d, etc. come into alignment. These aligned orifices, however, do not communicate with each other in view of the interposed partitions 55. With continued movement of the die-carrying members 27 and 29 in the direction of arrows 159 and 161, the orfices A–c, B–d, C–e, etc. become aligned and communicate with each other so that a single stream of molten thermoplastic material is extruded through such aligned orifices to again form integral, unitary junctions 157.

The operation thus far described is the same as that employed in making the fabric shown in FIG. 4. However, if the die-carrying members 27 and 29 are moved still further in the directions of arrows 159 and 161, the junction-forming streams are divided into strand-forming streams which intersect but do not contact with each other as the orifices A–d, B–e, C–f, etc. come into aligned but non-communicating relationship. Continued movement of the die-carrying members 27 and 29 in the directions of arrows 159 and 161 will place the orifices A–e, B–f, C–g, etc. into aligned and communicating relationship so that a single stream of molten thermoplastic material is extruded through each of such aligned orifices to again form the integral, unitary junctions 157.

The movement of the die-carrying members may be continued in the direction of arrows 159 and 161 or may be moved in directions opposite to that of arrows 159 and 161 to repeat the above sequence in reverse. In the netlike structure shown in FIG. 5, the strand-forming streams reverse their paths of travel at every other junction 157 rather than at each junction as in the netlike structure shown in FIG. 4. By increasing the stroke of die-carrying members 27 and 29 still further the strand-forming streams can be made to reverse their paths of travel, for example at every third, fourth or fifth junction.

The operation of the apparatus shown in FIG. 5 can be further modified by also imparting movement to the separator plate 49. For example, as the orifices A–c, B–d, C–e, etc., move into alignment as the die-carrying members 27 and 29 are urged in the directions of arrows 159 and 161, the separator plate 49 may also be moved to interpose a partition 55 between each of such aligned orifices. Thus, the molten material is extruded through such aligned but non-communicating orifices as separate strand-forming streams which intersect but do not contact with each other.

If the movement of the die-carrying members 27 and 29 is reversed as heretofore described when the orifices A–e, B–f, C–g, etc. are in alignment, the resulting netlike structure would be one in which the strand-forming streams had reversed their paths of travel at each junction, with such junction being separated by three intersections at which the strand-forming streams crossed but did not contact each other.

FIG. 6 diagrammatically illustrates the operation of a modified form of apparatus which is the same as that described above, with the exception that the separator plate partitions between the die-carrying members 27 and 29 are of non-uniform width. More specifically, the separator plate includes partitions 69 which are narrower than partitions 71.

In the positions of the die-carrying members 27 and 29 illustrated in FIG. 6, the sets of orifices are in aligned or registered relationship and in communication with each other. The molten thermoplastic material, therefore, issues through each of the aligned orifices A–a, B–b, C–c, etc. as a single stream to form integral, unitary junctions as indicated at 257. As the members 27 and 29 are moved in opposite directions, as shown by arrows 259 and 261, respectively, and with the partitions held stationary the sets of orifices are urged out of alignment so that the junction-forming streams are each divided to form mesh strand-forming streams.

Continued movement of the members 27 and 29 as indicated above, will bring into alignment orifices A–b, B–c, C–d, D–e, E–f, F–g, etc. causing the individual mesh strands to intersect. It will be noted, however, that only orifices A–b and F–g of the respective sets of aligned orifices illustrated are in communication with each other between the partitions 69 so that the molten thermoplastic material will issue from these particular aligned and communicating orifices as a single stream to form integral, unitary junctions, as indicated at 263. From the remaining aligned orifices, such as B–c, C–d, D–e and E–f, the molten thermoplastic material will continue to issue as mesh strand-forming streams which intersect but do not contact each other at their crossing points, such as indicated at 265, as a result of the interposed partitions 71.

With still further movement of the members 27 and 29 in the directions of arrows 259 and 261, the orifices A–c, B–d, C–e, D–f, E–g, etc. are placed in aligned and communicating relationship whereupon the molten thermoplastic material issues therefrom as integral, unitary junction-forming streams. The movement of the members 27 and 29 may now be reversed or continued in the direction of arrows 259 and 261 to repeat the above-described pattern of junction and strand-forming streams. The latter procedure; that is, continued movement in the directions of arrows 259 and 261, serves to increase the amplitude of the sinuous or zig-zag path assumed by the individual streams, in much the same manner as described with reference to FIG. 5.

The operation of the apparatus shown in FIG. 6 can also be modified, along the lines as described with reference to FIG. 5, by imparting movement to the separator bar in which the partitions 69 and 71 are formed. In this manner, the locations at which strand junctions are formed can be varied to thus provide the resulting netlike structure with a more random array of strand junctions and what appears as a random weave.

In all of the netlike structures described above, the presence of the intersecting but unconnected strands impart a three-dimensional character to such structure, in addition to rendering it more flexible and resistant to tearing.

Figure 7:
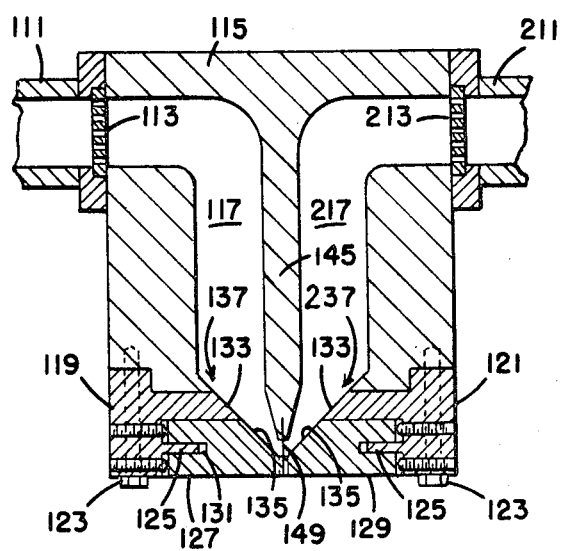
FIG. 7 is a view similar to FIG. 1 showing a modified form of apparatus.

The modified apparatus shown in FIG. 7 is designed to simultaneously extrude two plastic materials which differ in composition and/or color. More particularly, in this apparatus two extrusion barrels 111 and 211 deliver different molten thermoplastic materials through breaker plates 113 and 213 and into a block 115 having separate flow channels 117 and 217, as defined by a wall 145. Guides 119 and 121 are fixed by bolts 123 to the block 115 and are each formed with a rail 125 for slidable supporting die-carrying members 127 and 129.

Figure 2:
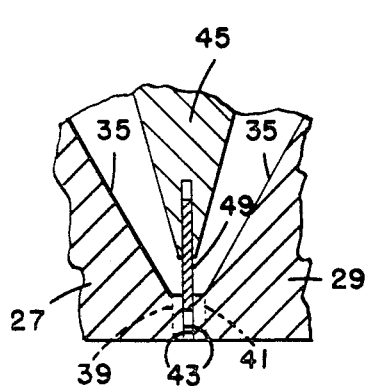
FIG. 2 is a fragmentary view illustrating a portion of the apparatus shown in FIG. 1 on an enlarged scale.

Surfaces 133 and 135 of the guides and die-carrying members cooperate with the opposing surfaces of the wall 145 to form cavities 137 and 237. The die-carrying members 127 and 129 are provided with sets of slots and orifices corresponding to the slots and orifices formed in the members 27 and 29 heretofore described. A separator plate 149 projects from the lower end of the wall 145 and may be formed with like partitions similar to the partitions 55 of the apparatus shown in FIGS. 1–3, or partitions of varying width, as illustrated in the apparatus of FIG. 6. As with the apparatus shown in FIGS. 1–3, the separator plate may remain stationary or may be moved relative to the wall 145 by suitable means not shown.

The operation of the apparatus shown in FIG. 7 is essentially the same as that heretofore described. With plastic materials of different compositions being extruded, the adjacent sinuous strands will be of one composition and/or color while those with which such strands will be of a different composition and/or color. In this manner, the resulting net-like structure can be tailored for desired decorative effects or to impart various other physical properties, such as higher strength, to specific areas thereof.

I claim:
1. Apparatus for continuously extruding a netlike structure including a pair of displaceable die-carrying members having opposing surfaces, a set of slots in each of said opposing surfaces defining cooperating complementary die-forming orifices in said die-carrying members, means for delivering flowable strand-forming materials to said slots, a separator plate positioned between said die-carrying members, said separator plate including means for confining the delivery of flowable strand-forming material to the slots in the die-carrying members, said separator plate further including a series of spaced partitions disposed in sliding contact with said opposing surfaces of said die-carrying members, means for displacing said die-carrying members relative to each other and said separator plate whereby orifices in one of such members are moved into and out of registration with orifices in the other of such members with said partitions preventing communication between at least some of such orifices at certain of their positions of registration.

2. Apparatus as defined in claim 1 wherein said separator plate closes the space between said die-carrying members which is adjacent to said delivery means.

3. Apparatus as defined in claim 1 wherein said spaced partitions are of like width.

4. Apparatus as defined in claim 1 wherein certain of said spaced partitions differ in width.

5. Apparatus as defined in claim 1 wherein said means for feeding flowable strand-forming materials to said slots include two separate feed chambers.

6. Apparatus as defined in claim 1 further including means for moving said separator plate.

7. Apparatus as defined in claim 1 wherein said partitions terminate at least adjacent to the orifices in said die-carrying members.

References Cited

UNITED STATES PATENTS

| | | | |
|---|---|---|---|
| 2,919,467 | 1/1960 | Mercer | 18—12(N)X |
| 3,019,483 | 2/1962 | Schultheiss | 18—12(N)X |
| 3,163,691 | 12/1964 | Anderson et al. | 18—12(N)X |
| 3,228,063 | 1/1966 | Gutierrez | 18—12(N) |

J. SPENCER OVERHOLSER, Primary Examiner

M. O. SUTTON, Assistant Examiner

UNITED STATES PATENT OFFICE
CERTIFICATE OF CORRECTION

Patent No. 3,584,341  Dated June 15, 1971

Inventor(s) Theodore H. Fairbanks

It is certified that error appears in the above-identified patent and that said Letters Patent are hereby corrected as shown below:

Col. 1, line 62, "extended" should read --extruded--; Col. 3, line 61, "alignment" should read --aligned--; Col. 4, line 40 "," should be a period -- . --; line 65, "capitol" should read -- capital --; Col. 6, line 1, "caried" should read -- varied --.

Signed and sealed this 4th day of January 1972.

(SEAL)
Attest:

EDWARD M. FLETCHER, JR.
Attesting Officer

ROBERT GOTTSCHALK
Acting Commissioner of Patents